Feb. 21, 1967 M. O. STEIN 3,305,729

AMPLITUDE SELECTIVE UNIPOLAR AMPLIFIER OF BIPOLAR PULSES

Filed April 4, 1963 2 Sheets-Sheet 1

INVENTOR.
MORRIS O. STEIN.
BY J. P. Santo
ATTORNEY.

AMPLITUDE SELECTIVE UNIPOLAR AMPLIFIER OF BIPOLAR PULSES

Filed April 4, 1963

2 Sheets-Sheet 2

INVENTOR
MORRIS O. STEIN
BY
ATTORNEY

United States Patent Office 3,305,729
Patented Feb. 21, 1967

3,305,729

AMPLITUDE SELECTIVE UNIPOLAR AMPLIFIER OF BIPOLAR PULSES

Morris O. Stein, Livonia, Mich., assignor to Burroughs Corporation, Detroit, Mich., a corporation of Michigan Filed Apr. 4, 1963, Ser. No. 270,686
7 Claims. (Cl. 307—88.5)

This invention relates to signal translating devices and, more particularly, to an amplitude selective unipolar amplifier as employed with and as a sense amplifier for a magnetic core information storage system supplying bipolar full level read signals and undesired half read signals from the sense winding thereof.

The invention has among its objects to provide an amplifier device of the above character which effectively discriminates against undesired noise signals, as half-read signals generated in the sense winding of a magnetic information core storage device, by cancelling and substantially eliminating such signals in its output, while translating higher level signals, such as full read signals, therethrough as unipolar output pulses of substantially constant amplitude level irrespective of the polarity of the signals applied to the input of the amplifier.

Related objects are to provide an amplifier device in accordance with and for accomplishment of the foregoing objects without resorting to customary gating, additional rectifying and gain reducing techniques as employed in prior forms of sense amplifiers.

The above and other objects, features and advantages of the invention together with the manner in which they are accomplished, will appear more fully from the following detailed description and drawings wherein.

Figure 1:
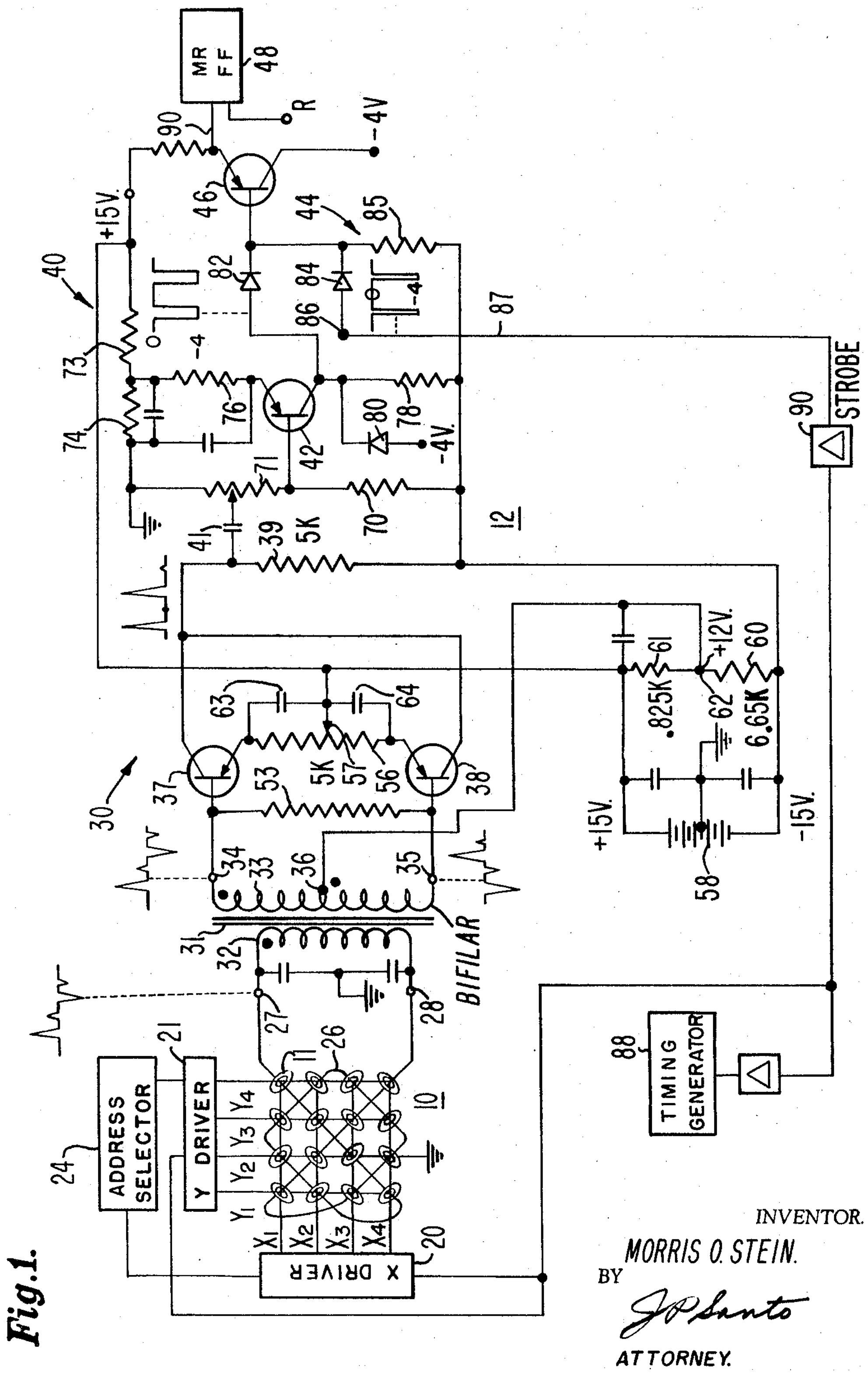
FIG. 1 is a schematic electric circuit diagram of a preferred form of the amplifier of the present invention as employed with and as a sense amplifier for a magnetic core information storage system.

Referring to the drawings, there is shown in FIG. 1 a representative memory core plane 10 of a coincident current, magnetic core low level storage device comprised of saturable, permanent magnet ferrite cores 11 and coupled to a two stage sense amplifier 12. As is well known such cores are bistable magnetic devices capable of assuming either one of two stable magnetic flux states or saturated conditions representing a binary "1" or "0," respectively. Operation of such a memory involves a read or write cycle during which the flux state or condition of a selected core is sensed to read the information stored therein and the same or a different flux state condition is maintained or re-established to retain or write the same information into the core or is established to write different information therein. The representative core plane is shown as a 4 x 4 co-ordinate array of cores 11 each of which is linked with a different one of a series of X row conductors or lines X1–4 and a different one of a series of Y column conductors or lines Y1–4. The X and Y conductors are connected in cascade with respective X drivers 20 and Y drivers 21 from which equal currents may be selectively and coincidentally applied under the control of an address selector 24 through any selected one of the X conductors and Y conductors to subject the core, located at the rectangular coordinate intersection of and linked by both of the selected conductors, to a resultant magnetic field for reading or writing of a binary bit of information from or into the core.

A sense winding 26 common to and passing through each of the cores is provided to sense the condition of a core linked by a selected X and Y conductor. Depending upon in which of its two bistable conditions the selected core has been previously placed and the direction of the applied driver currents, the sense winding develops an induced signal pulse between the output terminals 27, 28 thereof when the selected row and column conductors are pulsed.

In order to reduce the cumulative noise effect in the bit plane and the generation of undesired signals caused by stray pick-up and by the inductive coupling to the sense winding from the drive windings of the unselected cores in the row or column of a selected X conductor or Y conductor, the sense winding traverses adjacent cores in the opposite direction, an alternating or staggered diagonal orientation of adjacent cores commonly being employed. This results in the generation of bipolar signal pulses, i.e. positive or negative, across the output terminals of the sense windings depending upon the direction in which the sense winding is wound through the core linked by the selected X conductor and Y conductor, and, consequently, requires subsequent rectification where the sensed pulse is to be supplied to a unipolar utilization device such as a flip-flop responsive to undirectional pulses of only one polarity applied thereto.

Coupled to the bipolar sense winding 26 is the sense amplifier 12, the first or preamplifier stage 30 of which, according to the present invention, includes a step-up transformer 31 having a floating primary winding 32, which is connected in a closed loop to the terminals 27, 28 of the sense winding, and a center tapped, split secondary winding 33 furnishing a balanced input to a pair of signal translating or amplifying devices, shown as transistors 37, 38 connected in parallel, single ended output relation with a load 39 common to both of the transistors. The second stage 40 of the sense amplifier operates at a higher level than and is coupled to the first stage 30 through a coupling capacitor 41 connected to the input of an adjustable gain switching inverter stage comprised of transistor amplifier 42. Transistor 42 is connected in a common emitter configuration and furnishes an output from its collector through a diode negative AND gate 44 to an emitter follower output transistor 46 whose output is supplied from its emitter to a memory register flip flop or utilization device 48 responsive to a negative pulse applied thereto.

The step-up transformer 31 provides an impedance match from the sense winding to the first stage of the sense amplifier and furnishes a voltage gain of 1.5 for each portion of its split secondary windings between a respective one of its output terminals 34, 35 and its center-tap terminal 36. To reduce noise pick-up signals from the sense winding and common mode noise therein, a pair of capacitors 50, 51 is connected across the transformer or primary winding, as shown, to provide a low impedance path to ground, and the split secondary is wound as a bifilar winding relatively poled as shown. Connected between or across the secondary winding output terminals 34, 35 is a shunt resistor 53, which dampens any ringing tendence of the transformer and also serves to stabilize the secondary impedance by shunting the base-emitter impedance of the transistors 37, 38.

The transistors 37 and 38 are of similar conductivity type such as of the 2N1395 junction (PNP) drift field, high current and high speed variety, each having a base electrode, an emitter electrode and a collector electrode. The base electrodes are connected to the aforesaid secondary output terminals of the transformer, and the emitter electrodes are connected to the opposite ends of a balancing potentiometer 56. The differentially positionable arm 57 of the potentiometer 56 is returned to a positive biasing potential derived from a common source 58 of operating potential which has a grounded midpoint. Source 58 is shunted by a tapped bleeder element or voltage divider 60, 61 which is connected from its intermediate or junction point 62 to the center-tap terminal 36 of the transformer secondary winding 33. The collectors of the transistors are directly connected together to provide a parallel, single ended output therefrom and are connected to the same end of the common load resistor 39, the other end of which is connected to the negative or low potential side of the source 58 of operating potential. Capacitors 63 and 64 connected to the opposite or emitter ends of balancing potentiometer 56 and to the selectively positionable arm thereof are employed to provide a low impedance path to ground from the positive side of the supply for any signal component present at the emitters.

The coupling capacitor 41 blocks the D.C. component of current flowing in the load resistor 39 and supplies the unipolar output signal component from the first stage of the sense amplifier as a positively directed pulse to the adjustable gain inverter section of the second stage 40 of the sense amplifier. The base electrode of the transistor 42 is connected to the negative potential level of the junction of a voltage divider constituted by resistor 70 and gain adjusting potentiometer 71, which are connected between the negative or low potential side of the supply source 58 and ground with the adjustable arm of this potentiometer connected to the coupling capacitor 41. Another voltage divider constituted by the resistors 73 and 74, which are connected between the positive side of the supply source and ground, supplies a positive potential at its junction to the emitter of transistor 42 through the stabilizing resistor 76. The voltage dividers place the transistor in a normally conducting condition near saturation in the absence of an input signal. The collector of transistor 42, which is connected through output resistor 78 to the negative side of the supply source, is clamped through diode 80 to a —4 volt supply and is connected to one input of the negative AND gate 44.

The AND gate 44 is constituted by the switching diodes 82 and 84, the cathodes of which are connected through a gate sink resistor 85 to the negative side of the supply source 58 with the anode of diode 82 connected to the collector of transistor 42. The anode of diode 84 is connected to conductor 87 to receive a negative strobe or timing signal at the time that the read manifestation of the condition of a selected core would appear at the output of the transistor 42. The strobe pulse is derived from a clock source or timing generator 88 which initiates or controls the operation of the X and Y drivers to energize the selected drive lines and supplies a pulse through delay element 90 to the other input of the AND gate.

In the normally conducting condition of transistor 42, its collector potential will be approximately 0 volts which level will appear at the output of the AND gate, less the slight drop across diode 82, and will be applied to the base electrode of transistor 46 connected as an emitter follower. Application of a sufficiently positive signal from the output of the first stage 30 of the sense amplifier to the input of the transistor 42, reduces the conductivity of transistor 42 and lowers its collector potential negatively to the —4 volts clamp potential of clamping diode 80. If a negative strobe signal is received at the strobe terminal 86 of the AND gate at this time, a negative pulse is applied from the output thereof to the emitter follower where it appears on the output conductor 90 thereof supplied to the memory register flip flop 48. In the absence of a strobe signal, the approximately 0 volt level of the strobe terminal 86 of the AND gate holds the input to the emitter follower at 0 volts, despite the presence at transistor 42 of a negative output signal. By supplying the strobe signal only during the read portion of the read-write cycle of operation of the memory plane, any signals induced in the sense winding during the write portion of the cycle and producing an output at transistor 42 will not be transmitted through the AND gate.

Figure 3:
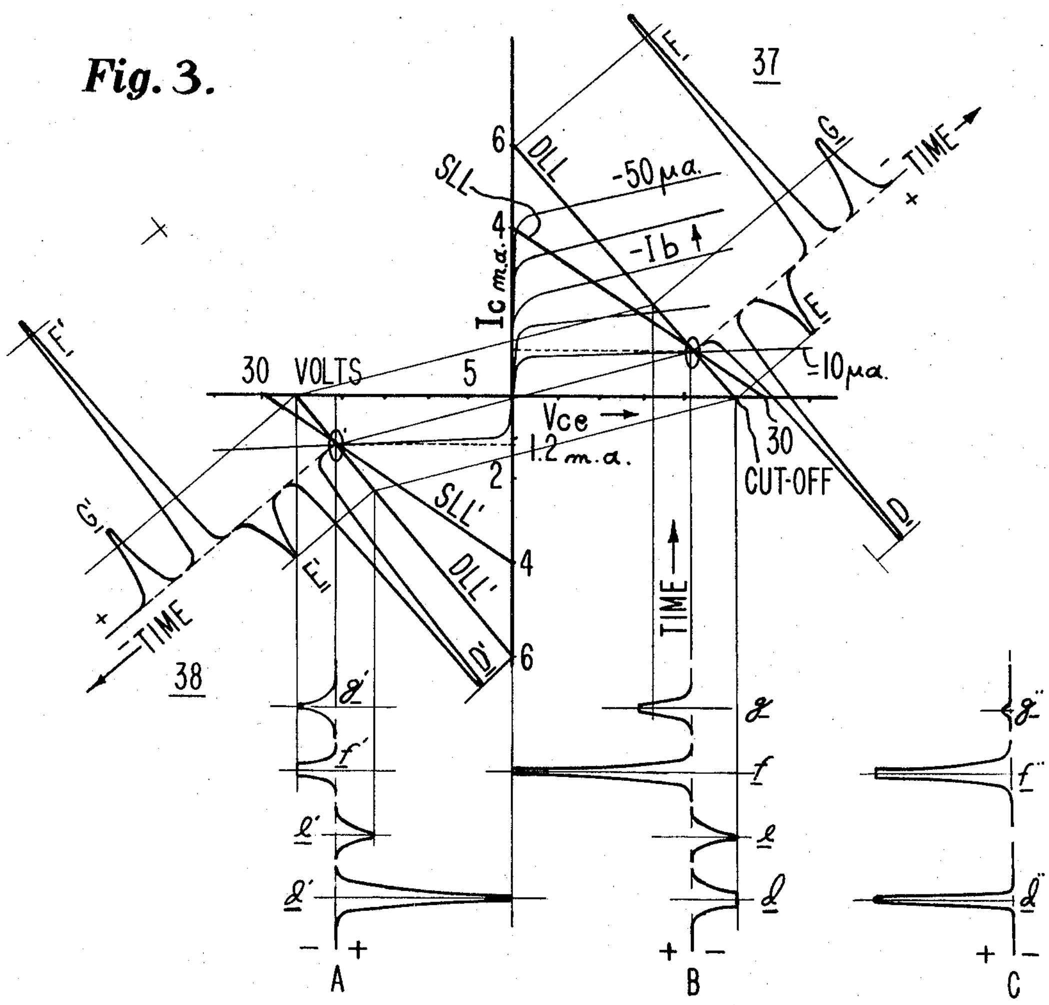
FIGS. 3, A, B and C are operating characteristics with input and output signals appearing in the sense amplifier of FIG. 1.
Figure 2:
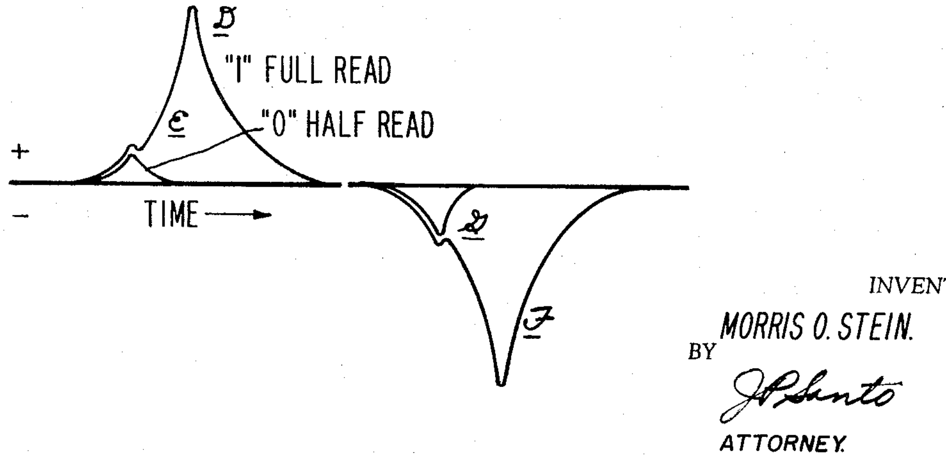
FIG. 2 illustrates typical waveforms of bipolar full level read signals and undesired half read or noise signals appearing in the sense winding of a representative magnetic core plane.

The operation of the sense amplifier will be described with reference to FIGS. 2 and 3 of which FIG. 2 represents signals furnished from the sense winding during several different read command conditions of the memory core plane and FIG. 3 represents the static and dynamic operating characteristics of the first stage 30 of the sense amplifier.

Treating first with FIG. 2, pulse *D* represents a read signal appearing across the terminals of the sense windings and resulting from the application of drive currents to the X and Y drive lines of a selected core having a residual state of magnetic saturation representing, say, a binary "1" bit of information stored therein. Since both the X and Y lines or windings of the selected core are energized, it is subjected to a resulting field from both the drive lines of such intensity and direction as to reverse the magnetic flux condition thereof from its initial to its opposite state of magnetization, the accompanying flux reversal in which induces the signal *D* therein. The induced signal may be either positive or negative depending upon the direction in which the sense winding is threaded through the selected core, as shown by signal *F*, which is of a polarity opposite that of signal *D* and is derived from another core.

If the core had been in its opposite state of magnetic saturation representing a binary "0" condition, the resultant magnetic field generated by the application of the same drive currents thereto would only drive the core further into saturation and would not be of the requisite direction to switch it to its other or binary "1" state of magnetic saturation. Thus, there would be no flux reversal in the core and no significant signal would be induced in the sense winding under this condition. It will be appreciated, however, that those cores contained in the same row or column as the selected X and Y conductors will also be influenced or disturbed by the current flowing through the X or Y conductor associated therewith. Depending upon their magnetization condition and the magnetization pattern of the core plane at the time, undesired signals may be induced which, under worst case conditions, combine in the sense winding to produce a significant output signal shown at *E* and referred to as a half-read signal. Reference is made to chapter 13 of the text, "Digital Applications of Magnetic Devices," by Meyerhoff et al., published in 1960 by John Wiley & Sons, Inc., of New York, for an explanation and analysis of the above and various related factors contributing to the generation of undesired signals in systems of this character.

The static and dynamic operating characteristics of the first stage of the sense amplifier are illustrated in the first and third quadrants of the collector characteristics of FIG. 3 for the transistors 37 and 38, respectively, plotted in terms of collector current $I_c$ in milliamperes against collector-emitter voltage $V_{ce}$ for various values of base biasing current, $-I_b$, in microamperes. The static load line, SLL, for the transistors 37, 38 is drawn between the short circuit current and open circuit voltage conditions in the circuit of FIG. 1 in which the indicated voltage level and component values for the operating supply voltage 58, load resistance 39 and balancing potentiometer 56 yield a static short circuit value of 4 ma., i.e., 30 v./7.5 k., for $I_c$ and an open circuit voltage value of 30 volts for $V_{ce}$.

Under dynamic or applied signal conditions, the signal current flowing in the collector-emitter path is bypassed around the balancing potentiometer 56 by the capacitors 63, 64. This establishes a dynamic short circuit value for $I_c$ of 6 ma., i.e. 30 v./5 k., as the ordinate value of the dynamic load line, DLL, which is drawn therefrom through the quiescent operating point 0 representing the D.C. current flowing in the collector circuit path under no signal operating conditions and the base biasing current required to maintain this value of collector current.

The biasing current is derived from the voltage developed over voltage divider 60, 61. The potential at the junction point end 62 of the voltage dropping element 61 is approximately +12 volt and is supplied to the center-tap terminal 36 of the transformer secondary winding, while the potential at its other end is that of the +15 volt terminal of the source 58 and is supplied to the adjustable arm 57 of the balancing potentiometer 56. The resultant 3 volt difference in potential forward biases the transistors 37, 38 and forces an emitter current $I_e$, which is limited or determined by the resistance of that section of the balancing potentiometer 56 connected in each transistor circuit or approximately half the potentiometer resistance. This yields a value for $I_e$ of about 1.2 ma., i.e. 3 v./2.5 k., which is related to the base biasing current $-I_b$ by the factor $(\beta+1)$, where $\beta$ is approximately 125 for the transistor types employed herein. With the value of base biasing current thus established, the intersection of the static load line with the selected base bias current characteristic establishes the quiescent operating point 0 of the circuit through which the dynamic load line is completed.

It will be noted that the operating point thus established is not symmetrically or centrally positioned on the load lines and that the permissible collector to emitter signal voltage swing for a large positive going input signal applied to the base of transistor 37 before a cut-off condition occurs therein is substantially less than the permissable voltage swing for a negative going input signal, thus characterizing the operation of the system as class AB amplifier operation for signals of a level above that which would drive one or the other of the amplifiers to cut-off. With respect to signals below this level, equal swings of collector to emitter voltage will be obtained for both positive and negative input signals as in the case of class A operation. Thus, by choosing the circuit parameters in relation to the anticipated level under worst case conditions of an undesired read and noise signal applied to the input of the above described sense amplifier and by balancing the current flow from the transistors to provide equal conduction therefrom under static conditions, such signals will be cancelled or substantially eliminated by differentially combining them in the output of the system. Signals above this level will drive one of the transistors 37, 38 to cut off and cause current to flow therein for only part of the period of the input signal, while permitting current to flow in the other or oppositely driven transistor for the entire period of the input signal, and thus, will produce a resultant signal in the output of the system.

This is graphically illustrated in FIG. 3 which depicts the effect in the output of the first stage of the sense amplifier of FIG. 1 of a series of current pulses D, E, F, G, and D′ E′, F′, G′ of negative and positive polarity that are derived from and correspond to bipolar desired and undesired signals *D, E, F, G,* which are developed in the sense winding and are applied to the primary winding of the coupling transformer. The current pulses are shown on interrupted time bases drawn from the quiescent operating points and normal to the dynamic load lines, DLL and DLL′, of the respective transistors 37 and 38 with the corresponding pulses shown as being of equal amplitude and of opposite polarity as applied to the bases of the respective transistors from the output terminals 34, 35 of the transformer secondary winding. For example, pulse D, shown in the first quadrant operating characteristics 37, represents the signal current pulse appearing at terminal 34 and the base of transistor 37 for a positive going full level read signal developed in the sense winding upon the selection of a core having a binary "1" state of magnetization. The polarity of input pulse D is shown as being of such direction as to drive the base of forwardly biased transistor 37 increasingly more positively and, therefore, to drive it into cut-off, thereby decreasing collector current therefrom. Corresponding or counterpart pulse D′, shown in the third quadrant operating characteristics, represents the signal current pulse appearing at terminal 35 and the base of transistor 38 for the aforementioned full level read signal developed in the sense winding and is shown as being of a polarity or direction opposite that of pulse D and to increase the negative bias at the base of forwardly biased transistor 38 and draw more current therefrom.

Pulses E and E′ represent the signal input pulses which are applied to the bases of transistors 37 and 38 and are derived from a positive going undesired half-read or read and noise pulse developed in the sense winding under worst case conditions upon the selection of a core having a binary "0" state of magnetization. Pulses F, F′ and G, G′ are of respectively opposite polarity from the pulses D, D′ and E, E′ and represent the current pulses applied to the bases of the transistors 37, 38 and derived from a negative going higher level desired read or sensed binary 1 signal and an undesired read or sensed binary 0 worst case signal, respectively.

Application of the aforementioned input signal current pulses to the transistors 37 and 38 changes the conductivity of and the collector-emitter voltage drop across the respective transistors from the static or average D.C. value thereof in the manner illustrated by the projected voltage waveforms of FIGS. 3A and 3B in which pulse *d* of FIG. 3B represents the amount $V_{ce}$ of transistor 37 has been increased from its static level upon the application of the input signal current pulse D driving transistor 37 past cutoff. Voltage pulse *d′* of FIG. 3A represents the change in the voltage level of the collector or the amount $V_{ce}$ of transistor 38 has been decreased from its static level upon application of the counterpart pulse D′ of input signal current pulse D to transistor 38. Of course, a reduced voltage drop across the transistor results in an increased voltage available across the load resistance, and vice versa, and reflects the voltage change across the load or the dynamic output signal voltage arising from the input signal.

By reason of the balanced input connection of the first stage of the sense amplifier, the derived input signal current pulses D and D′ are of opposite phase or polarities and produce opposite polarity output signal voltages, which, by reason of the direct connection of the collector electrodes and their common connection to the same side of the load resistance, are combined algebraically and, hence, in a resulting differential manner. Thus, the difference between the voltage pulses *d′* and *d* will be reflected at or across the load as the resulting output signal as represented by the pulse *d″* of FIG. 3C, which will be seen always to be of positive and unipolar polarity irrespective of the polarity of the signal pulse applied to the primary winding of the coupling transformer.

It will be seen that the voltage pulses *e, e′* representing the collector voltage changes due to input current pulses E, E′ derived from a positive going, undesired or half read input signal *E* are of equal amplitude, since the input current pulses E and E′ are within the class A operating limit of the amplifier and are of such amplitude as not to drive one of the transistors past cut-off. Therefore, the voltage pulses *e* and *e′* will cancel and produce no net change across the load resistance and, thus, no output signal voltage therefrom. A slightly larger input pulse, as pulse *G* producing current pulses G and G′, will drive one of the transistors past cut-off and produce output voltages *g, g′* of slightly different amplitudes by reason of the clipping action of the transistor driven into cut-off. However, the difference in voltage *g″* between the resulting pulses will be slight and of insufficient level to affect the conductivity of the transistor 42 in the second stage of the sense amplifier sufficiently to produce any output therefrom.

With respect to an applied, higher level read signal that drives one of the transistors into saturation as shown by derived input current pulse F in FIG. 3, saturation clipping will result in the output voltage pulse *f* produced therefrom and cut-off clipping in the voltage pulse *f′* resulting from its counterpart pulse F′. This results in substantially constant level or amplitude limited net output voltages at the load from variable amplitude full read signals applied to the primary winding of the coupling transformer.

It can be appreciated that operation of the first stage of the sense amplifier of FIG. 1 in class B or such manner where only one or the other of the transistors 37 or 38 conducts in response to and depending upon the polarity of an input signal applied to the input of the amplifier, will not provide any cancellation or rejection of undesired noise, read and other signals therein and that conventional push-pull operation thereof will produce a bipolar output therefrom requiring subsequent rectification. This is accomplished in some forms of push-pull sense amplifiers with full-wave diode rectifiers in the input or output of the amplifier, and is objectionable, not only from the standpoint of the added components, but also because such diodes are noticeably affected by temperature variations rendering the output signal dependent on temperature.

The parallel, single ended output connection of the preamplifier section described herein provides a unipolar output therefrom and eliminates the need for subsequent rectification, thereby rendering the output therefrom independent of temperature. The stability of the sense amplifier is further improved in this respect by reason of the stabilizing effect of the balancing potentiometer 56 connected between the emitters of the transistors 37 and 38 and by fixing, instead of floating, the potential of the emitters. It will be noted that the emitters are connected through the respective sections of the balancing potentiometer 56 to the fixed +15 volt side of the supply source 58 while the base electrodes are connected through the respective sections of the bifilar secondary winding of the transformer to the +12 volt level of the junction point 62 of the divider 60, 61. The transistors 37 and 38 are thus forward biased, forcing emitter current flow therein and a fixed collector current $I_c$ which is substantially independent of temperature.

What is claimed is:

1. The combination with a source of bipolar signals producing pulses of either polarity, of an amplitude selective unipolar amplifier comprising a pair of amplifying devices having a pair of inputs and a parallel connected, single-ended output, a load circuit common to and connected to the output of said amplifying devices, means coupling the amplifying devices to the bipolar source and providing a balanced input connection for application of input pulses of equal amplitude but opposite polarity to the inputs thereof from a signal pulse of either polarity produced by said bipolar source, and fixed external biasing means biasing the amplifying devices for equal conduction and output current flow therefrom in the absence of the application of an input signal pulse thereto and conditioning each amplifier for class A operation and equal but opposite signal current flow therefrom for an input signal pulse below a predetermined amplitude level and for class AB operation for an input signal pulse above a predetermined amplitude level, whereby only an input signal pulse above a predetermined amplitude level will exert a net effect and appear across the load as a unipolar output signal pulse of one polarity irrespective of its polarity as applied to the input connection of said amplifying devices.

2. In combination, a bipolar source producing signal pulses of either polarity and of different amplitude levels, a first and second signal amplifier each having an input and an output, a load circuit, means coupling the inputs of said amplifiers to said source in a balanced input current relation and the outputs of said amplifiers to said load in parallel, single ended output circuit relation, and means biasing said amplifiers to provide equal conduction therefrom in the absence of a signal applied thereto, equal but opposite output signals therefrom for the entire period of an applied input signal below a predetermined amplitude level, and unequal outputs therefrom for an applied input signal above said predetermined level producing signal output current flow from one of said amplifiers for the entire period of the applied input signal and from the other amplifier for less than the entire period of the same input signal.

3. In combination, a bipolar source producing signal pulses of either polarity and of different amplitude levels, a first and second signal amplifier each having an input and an output, a load circuit, means coupling the inputs of said amplifiers to said signal source in a balanced input circuit relationship and the outputs of said amplifiers to said load in parallel, single-ended output circuit relationship and means biasing said amplifiers to provide equal but opposite outputs therefrom for input signal pulses of either polarity below a predetermined level, substantially linear amplification action of one of said amplifiers over substantially the entire range of amplitudes of signal pulses of one polarity, and a cut-off clipping action of the other amplifier for such signal pulses above a predetermined level.

4. The combination with a bipolar source producing pulses of either polarity and of different amplitude levels, of an amplitude selective unipolar amplifier comprising a pair of transistor amplifying devices each of like conductivity and having a base electrode, emitter electrode and a collector electrode, a load circuit, means coupling the transistor amplifying devices to the bipolar source and providing a balanced input connection for application to the base electrodes of pulses of equal amplitude but opposite polarity from a pulse of either polarity produced by said bipolar source, means coupling the collector electrodes to one side of said load circuit in parallel, single-ended output circuit relationship therewith, a variable resistance connected between the emitter electrodes of said transistors, and a source of potential providing a fixed external biasing potential through the variable resistance forwardly biasing the transistors for equal conduction and output current flow therefrom in the absence of an input signal pulse applied thereto and conditioning each transistor for class A amplifier operation for input signal pulses below a predetermined amplitude level and for class AB amplifier operation for input signal pulses above a predetermined amplitude level, whereby only input pulses above a predetermined amplitude level will exert a net effect on the load and appear thereacross as a unipolar pulse of one polarity irrespective of its polarity as applied to the source coupling means.

5. An amplitude selective unipolar sense amplifier for a magnetic information storage system including a matrix of bistable magnetic memory cores co-ordinately arranged in columns and rows with a separate column conductor and a separate row conductor for each column and each row of cores, each of which cores is coupled to a different column conductor and row conductor and a sense winding common to each of said cores and supplying sensed signals therefrom of different amplitudes and either polarity, said sense amplifier comprising a transformer having an input winding connected to said sense winding and a secondary winding having a center-tapped terminal and a pair of output terminals and developing signals of equal amplitude but opposite polarity from a signal applied to its primary winding from said sense winding, a pair of amplifying devices each having a control electrode connected to a different one of said transformer secondary output terminals, a pair of output electrodes directly connected together, and a pair of input electrodes, an adjustable potentiometer having its opposite terminals connected to a different one of said input electrodes, a load circuit having one end connected to both of said output electrodes, a source of operating potential having one side connected to the other end of said load circuit and its other side connected to said input electrodes through said adjustable potentiometer, and a voltage divider connected across said source of operating potential and providing a biasing potential between said center-tap transformer terminal and said input electrodes through said adjustable potentiometer for biasing said input electrodes at a potential above that of the control electrodes and establishing an operating point conditioning said amplifying devices for class A operation for input signals below a predetermined amplitude level and class AB operation for signals above that level.

6. The combination with a magnetic memory core plane having a bipolar sense winding producing signal pulses of either polarity, of an amplitude selective unipolar sense amplifier comprising a pair of transistors each of like conductivity and having a base electrode, an emitter electrode and a collector electrode, means coupling the sense amplifier to the bipolar sense winding and providing a balance input connection for application of input pulses of equal amplitude but opposite polarity thereto from a signal pulse of either polarity produced by said bipolar sense winding, said coupling means comprising a step-up transformer having a primary winding connected to the bipolar sense winding and a center tapped secondary winding the output terminals of which are connected to a different one of the base electrodes of respective ones of said transistors, a load circuit having one side connected to the collector electrodes of said transistors to provide a parallel, single ended output therefrom, a current limiting resistance element connected between the emitter electrodes of said transistors, and a fixed external source of biasing potential forward biasing said transistors and having one side connected to the center tap of the transformer secondary winding and its other side connected to an intermediate point on said current limiting resistance element to provide equal conduction of said transistors in the absence of an input signal pulse applied thereto, said current limiting resistance element and said source of biasing potential establishing an operating point for said transistors and conditioning them for class A operation with equal but opposite signal current flow therefrom for an input signal pulse below a predetermined amplitude level and for class AB operation for an input signal pulse above a predetermined level, whereby only an input signal pulse above a predetermined amplitude level will exert a net effect and appear across the load as a unipolar output signal pulse of one polarity irrespective of its polarity as applied to the input of said sense amplifier.

7. The combination in accordance with claim 6 above wherein said step-up transformer has a bifilar center-tapped secondary winding.

References Cited by the Examiner

UNITED STATES PATENTS

| | | | |
|---|---|---|---|
| 3,036,274 | 5/1962 | Greatbatch | 330—15 |
| 3,109,110 | 10/1963 | Lewis | 330—15 |

ARTHUR GAUSS, *Primary Examiner*.

R. H. EPSTEIN, *Assistant Examiner*.